United States Patent Office 3,555,121
Patented Jan. 12, 1971

3,555,121
METHOD FOR MANUFACTURING HIGH IMPACT POLYOXYMETHYLENE GRAFT COPOLYMERS
Atsushi Tanaka, Hideo Sawada, Hirotaka Toba, and Masatoshi Mikumo, Iruma-gun, Saitama, Japan, assignors to Daicel Ltd., Osaka, Japan, a corporation of Japan
No Drawing. Filed Nov. 13, 1967, Ser. No. 682,540
Claims priority, application Japan, Nov. 15, 1966, 41/75,080
Int. Cl. C08g 1/18
U.S. Cl. 260—887                                       7 Claims

ABSTRACT OF THE DISCLOSURE

Disclosed herein is a process for producing a new polyoxymethylene graft copolymer having improved impact strength without a sacrifice in crystallinity.

This invention relates to a method of producing thermally stable polyoxymethylene graft copolymers uniform in composition and having an excellent workability and shock resistance which comprises polymerizing trioxane in the presence of an organic solvent and a Lewis acid type polymerization catalyst by using an olefine or diene copolymer having an alcohol ester or acid ester group in the side chain as a trunk polymer.

The greatest defect of polyoxymethylene polymers is their low thermal stability. Enormous research efforts have been made in the past to improve this defect. It is well known that commercial products have recently been made partly by copolymerization and partly by the development of a stabilizing treatment and a stabilizer. A so-called polyacetal resin thus made has excellent properties and is therefore establishing its own position in the field of plastics today. However, in meeting a wider field of its application, there are still many unsatisfactory points. One of the problems is the insufficiency of the impact strength or shock resistance.

The shock resistance of the polyacetal resin is generally lower than those of the so-called high impact plastics and is considered to be a problem as the field of its application widens. In the method using copolymerization, it is difficult to modify or improve the impact strength of the polymers without sacrificing their crystallinity which is characteristic of polyoxymethylene.

Thus, it is an important and difficult problem to improve the above mentioned defect while maintaining a proper crystallinity without losing the characteristics of the polyoxymethylene.

On the other hand, the low thermal stability of polyoxymethylenes is considered to be mostly due to the —O—CH$_2$—OH at the terminal and the so-called terminal blocking by the esterification or etherification of the OH group at the terminal has been carried out.

V. Jaacks et al. suggest on page 73 of Makromolekulare Chemie vol. 83 (1965) that, in case trioxane is polymerized in the presence of a polymethyl methacrylate, polyvinyl acetate or cellulose acetobutyrate, a graft-copolymerization will occur.

We considered that, if a graft-copolymerization occurs, the same result as of the terminal blocking will be obtained and that, as a result of the graft-copolymerization, it will be possible to improve the impact strength; and we have polymerized trioxane in the presence of various polymers. As a result, we have discovered that, for the purposes of the present invention as are mentioned above, if an olefine or diene copolymer having an alcohol ester or acid group in the side chain, or, in other words, a copolymer obtained by copolymerizing an olefine or conjugated diolefine monomer and a polymerizable unsaturated carboxylic ester or polymerizable fatty acid unsaturated alcohol ester monomer, is used as a trunk polymer and is dissolved and diluted in an organic solvent, trioxane is added to the solution, a Lewis acid is added thereto as a polymerization catalyst and a reaction is caused under heating while vigorously stirring and mixing, favorable results will be obtained.

In the above mentioned article of V. Jaacks et al., there is given an example in which a polymethyl methacrylate, polyvinyl acetate or cellulose acetobutyrate is used as a trunk polymer. However, there is only given a brief description that is insufficient to show the manufacturing condition of practical polymers. No positive proof to confirm the production of a graft copolymer is clearly shown therein. Further, there is no suggestion of the improvement of the shock resistance of polyoxymethylenes therein. Further, it is anticipated that such trunk polymer will act as a chain transfer agent, the growing polyoxymethylene chain will be blocked at the terminal by the —C—O—C linkage in the trunk polymer and therefore the produced polymer will be stabilized. In fact, the stability will be improved. But, in case such trunk polymer as in said article is used, in case a solution-polymerization is carried out, it will become partly insoluble and will precipitate during the polymerization and only a heterogeneous polymer will be obtained probably because, as numerous chain transfer points are present in one molecule, a high degree of grafting or cross-linking will occur. However, if the amount of the trunk polymer is decreased and is diluted, the degree of insolubility will be reduced but the possibility of stabilization will also be reduced on the contrary, and therefore, the stability will not be able to be balanced with other physical properties.

However, we have discovered that, in case such chain transfer points are diluted and dispersed by the copolymerization with an inert ingredient, it will be now possible to balance the stability with the physical properties, especially the shock resistance.

That is to say, we have discovered that, if a copolymer of an olefine or conjugated diolefine containing an alcohol ester or acid ester group in the side chain is used as a trunk copolymer, a homogeneous polymerization will occur, flexibility or impact resistance as well as a proper thermal stability will be able to be given to the polyoxymethylene polymer and thus a new useful plastics composition material will be able to be produced.

The trunk polymer to be used in the present invention is produced by the copolymerization of (a) one or more monomers selected from the group consisting of such polymerizable alkyl esters of unsaturated carboxylic acids as acrylic ester, methacrylic ester, itaconic ester, fumaric ester, maleic ester and crotonic ester and such polymerizable alkenyl esters of aliphatic carboxylic acids as vinyl formate, vinyl acetate, vinyl propionate, vinyl butyrate, vinyl stearate and isopropenyl acetate and (b) such olefine or conjugated diene type hydrocarbon monomer in which the second order transition point of its homopolymer is below —20° C. as, for example, ethylene, propylene, butylene, isobutylene, butadiene or isoprene. A composition of 3 to 50% by weight of the ingredient (a) and 50 to 97% by weight of the ingredient (b) will give a favorable result. In such case, as described above, the ingredient (a) will become a reaction point to cause a graft-copolymerization of trioxane by a chain transfer. When the composition of said ingredient (a) is more than 50%, the flexibility of the olefine or conpolymer will be lost and not only no reinforcing effect on the improvement of the shock resistance of the trioxane polymer will be shown but also such violent graft-copolymerizing reaction as is described above will be caused and a hardly soluble and hardly fusible polymer having cross-linking will be apt to be produced. Therefore, it is not desirable. On the other hand, when the composition (a) is less than 3%, the graft-copolymerizing reaction will not proceed smoothly and therefore the thermal stability will be insufficient. Therefore, it is also improper.

As examples of such olefine copolymers, there are an ethylene-vinyl acetate copolymer, ethylene-ethyl acrylate copolymer, ethylene-methyl methacrylate copolymer, propylene-butyl acrylate copolymer and isobutylene-diethyl fumarate copolymer. Ethylene-vinyl acetate copolymer containing 10–50 wt. percent vinyl acetate, ethylene-acrylate copolymer containing 5–20 wt. percent acrylate are preferred. As examples of such diolefine copolymer, there are numerated a butadiene-methyl methacrylate copolymer and butadiene-methyl acrylate copolymer. Butadiene-acrylate and -methacrylate containing 10–50 wt. percent acrylate or methacrylate are preferred. But it is not limited to them. Further it is possible to adjust the number and length of the branches of the produced graft-copolymer by the content of the ester side chains in such copolymer so that the properties of the produced polymer may be freely varied. Very generally speaking, it seems that, when a trunk polymer comparatively low in the ester contact is used, there will be obtained a product high in the moldability and of properties desirable for plastic materials.

Further, there is no particular limitation to the mixing ratio of the trunk polymer and trioxane. But, generally, when about 2 to 50 parts by weight of the trunk polymer are used per 100 parts by weight of trioxane introduced into the polymerizing system, favorable results will be obtained.

Now, the Lewis acid catalyst to be used in the present invention is a metal halide for example, of boron, aluminium, titanium, tin, antimony or iron. Particularly typical among them is boron trifluoride (or its diethyl ether complex compound), aluminum chloride, aluminum bromide, titanium tetrachloride or stannic tetrachloride. The amount of addition of such catalyst is not critical. However, it is selected to be in a range of 0.1 to 50 parts per 100 parts of trioxane by weight.

Further, as an organic solvent in the present invention, there can be generally used any solvent which has a sufficient ability to dissolve the olefine or conjugated diolefine copolymer used as a trunk polymer and is substantially inert to the polymerization catalyst. Particularly suitable are polar solvents such as hydrocarbon halides, for example, chloroform, ethylene dichloride, methylene chloride or chlorobenzene, or nitrobenzene.

The amount of use of such solvent is not limited. However, if a too large amount thereof is used, not only the rate of reaction and graft efficiency will be reduced but also the resin producing ability per unit volume will be reduced. Therefore, it is not desirable. It is desirable to carry out the polymerization by using an amount as small as possible.

The polymerization temperature is selected to be in the range of between 0 and 100° C. At a temperature lower than this range, the rate of polymerization of trioxane will be so low as not to be adapted to the actual production. Further, at a temperature higher than that, the polymerization reaction will be so violent that a heterogeneous, hardly soluble and hardly fusible polymer will be produced or the produced polymer will again decompose and the yield will be reduced. Therefore, it is improper.

Lastly, the method of the present invention can be well applied not only to the case of the graft-copolymerization of trioxane alone but also to the case of a mixture of trioxane and a small ratio of such cyclic ether, as for example, ethylene oxide or propylene oxide or such compound as epichlorohydrin.

The present invention shall be explained more concretely with the following examples in which, unless otherwise specified, the reduced viscosity is a value measured at 60° C. by using as a solvent p-chlorophenol containing 2% by weight α-pinene.

EXAMPLE I

A solution prepared by dissolving 2 g. of a vinyl acetate-ethylene (at a weight ratio of 45/55) copolymer of a reduced viscosity and from 2.0 and 5 g. of trioxane into 30 ml. of chloroform was put into a glass ampoule in which the atmosphere had been well replaced with nitrogen; 1 ml. of boron trifluoride-diethyl etherate was added thereto. The ampoule was then fused and sealed and the contents were polymerized while being stirred at 50° C. for 3 days.

Then the contents were taken out, methanol was added thereto and the produced polymer was separated by an ordinary operation to obtain 5.1 g. of a white elastic polymer of a reduced viscosity of 0.42. This polymer was first extracted with boiling chloroform but no vinyl acetate-ethylene copolymer was seen to be present in the chloroform. Then it was well extracted with (hot) dimethyl formamide and methanol was added to the extract but the precipitation of a polyoxymethylene was very slight. When an infrared absorption spectrum of the polymer thus extracted in two steps were investigated, an ether and acetic ester linkage was seen to be present. A graft copolymer was evidently confirmed to have been produced.

When 4.4 butylidene bis(6-t-butyl-m-cresol) was mixed as a stabilizer into the produced polymer and the mixture was heat-pressed at 190° C., a tough sheet having a considerable flexibility was obtained.

EXAMPLE II

When a polymerization was carried out under exactly the same conditions as in Example I except that 1 ml. of a solution of 2 mols of stannic tetrachloride in n-hexane chloroform and 1 ml. of boron trifluoride-diethyl etherate in Example I, there were obtained 5.5 g. of a white elastomeric polymer of a reduced viscosity of 0.45 insoluble in chloroform.

A sheet obtained by heat-pressing the produced polymer was very tough.

EXAMPLE III

When a polymerization was carried out under exactly the same polymerization prescription and reaction conditions as in Example I except that the composition of the trunk polymer in Example I was changed and a vinyl acetate-ethylene (at a weight ratio of 28/72) copolymer of a reduced viscosity of 0.56 was used, there were obtained 5 g. of a chloroform-insoluble elastomeric graft copolymer of a reduced viscosity of 0.28.

EXAMPLE IV

A solution prepared by dissolving 2 g. of an ethyl acrylate-ethylene (at a weight ratio of 7/93) copolymer of a reduced viscosity of 1.1 (as measured with a toluene solution of 0.5% at 40° C.) and 5 g. of trioxane into a mixed solvent of 20 ml. of toluene and 10 ml. of chloroform was put into the same apparatus as in Example I, 1 ml. of a solution of 2 mols of stannic tetrachloride in n-hexane was added thereto and the contents were polymerized at 60° C. for 3 days. After the polymerization, methanol was added thereto and the produced polymer was separated by an ordinary process to obtain 2.8 g. of a light brown elastomeric polymer of a reduced viscosity of 0.18. It was detected that an ester linkage was present together with an ether linkage even in the residual polymer after the produced polymer was extracted with hot toluene and the unreacted ethylene copolymer was removed. It was evidently confirmed that a graft copolymer had been produced.

EXAMPLE V

A solution prepared by dissolving 1 g. of a rubbery methyl methacrylate-butadiene (at a weight ratio of 40/60) copolymer and 5 g. of trioxane into 40 ml. of chloroform and 1 ml. of boron trifluoride-diethyl etherate were put into the same apparatus as in Example I and the contents were polymerized at 40° C. for 3 days. In the same manner as in Example I, the polymer was separated to obtain 1.6 g. of a light brown elastomeric polymer. When the produced polymer was heat-pressed, a light brown flexible tough sheet was obtained.

It is to be understood that the foregoing detailed description is given merely by way of illustration and that many variations may be made therein without departing from the spirit of our invention.

The embodiments of the invention in which an exclusive property or privilege is claimed are defined as follows:

1. A method for manufacturing high polyoxymethylene graft copolymers characterized in that 2 to 50 parts by weight of a copolymer obtained by the copolymerization of (a) 3 to 50% by weight of at least one monomer selected from the group consisting of polymerizable alkyl esters of unsaturated carboxylic acids and polymerizable alkenyl esters of aliphatic carboxylic acids and (b) 50 to 97% by weight of an olefine or conjugated diolefine monomer is used as a trunk polymer and is reacted in an organic solvent with 100 parts by weight of a ring-opening polymerizable monomer consisting essentially of trioxane in the presence of a Lewis acid as a polymerization catalyst.

2. The method according to claim 1, wherein said copolymer is ethylene-vinyl acetate copolymer containing 10–50% by weight of vinyl acetate.

3. The method according to claim 1, wherein said copolymer is ethylene-acrylate copolymer containing 5–20% by weight of acrylate.

4. The method according to claim 1, wherein said copolymer is butadiene-acrylate or butadiene-methacrylate copolymer containing 10–40% by weight of acrylate or methacrylate.

5. The method according to claim 1, wherein said ring-opening polymerizable monomer is a mixture of trioxane and a small ratio of a compound selected from the group consisting essentially of cyclic ethers including ethylene oxide and propylene oxide and epichlorohydrin.

6. The method according to claim 1, wherein said Lewis acid is boron trifluoride or its diethyl ether complex.

7. The method according to claim 1, wherein said organic solvent is selected from the group consisting of hydrocarbon halides including chloroform, ethylene dichloride, methylene chloride and chlorobenzene and nitrobenzene.

References Cited

UNITED STATES PATENTS 3,346,663   10/1967   Kern et al. _____ 260—823

FOREIGN PATENTS 1,010,072   11/1965   Great Britain _____ 260—823

OTHER REFERENCES

13537/63, Japan (Catalytic Chem. Co.) 260—887.

SAMUEL H. BLECH, Primary Examiner

M. J. TULLY, Assistant Examiner

U.S. Cl. X.R.

260—67, 896, 897

PO-1050
(5/69)

UNITED STATES PATENT OFFICE
CERTIFICATE OF CORRECTION

Patent No. 3,555,121                    Dated January 12, 1971

Inventor(s) Atsushi Tanaka et al.

It is certified that error appears in the above-identified patent and that said Letters Patent are hereby corrected as shown below:

Please correct the following errors:

On page 1, column 1, line 70 after the word "acid" and before the word "group" the word <u>este</u> should be inserted.  On page 1, column 2, line 67 after the prefix "con-" please add <u>jugated diolefine copolymer itself which is a trunk</u>.  On page 2, column line 15 please add an <u>e</u> to the word "numerated" making it <u>enumerated</u>.  Also on page 2, column 3, line 25 change the word "contact" to read <u>content</u>.  On page 2 column 4, line 37 after the word "n-hexane" please delete the words "chloroform and 1 ml. of" and insert the words <u>was used instead of the</u>.

Signed and sealed this 11th day of May 1971.

(SEAL)
Attest:

EDWARD M. FLETCHER, JR.           WILLIAM E. SCHUYLER, JR.
Attesting Officer                 Commissioner of Patents